United States Patent
Takeuchi

[11] Patent Number: 5,674,004
[45] Date of Patent: Oct. 7, 1997

[54] DEVICE AND METHOD FOR SUPPLYING FLUID MATERIALS

[75] Inventor: Hiroshi Takeuchi, Tokyo, Japan

[73] Assignee: Shinko Sellbic Co., Ltd., Tokyo, Japan

[21] Appl. No.: 499,172

[22] Filed: Jul. 7, 1995

[30] Foreign Application Priority Data

Jul. 11, 1994 [JP] Japan ................................ 6-158940

[51] Int. Cl.⁶ .................................................. B29C 65/40
[52] U.S. Cl. .......................... 366/69; 366/76.1; 366/77; 366/99; 366/279; 425/207
[58] Field of Search ................... 366/69, 76.1, 76.3, 366/76.5, 76.93, 77, 79, 97, 98, 99, 245, 247, 249, 279; 425/207

[56] References Cited

U.S. PATENT DOCUMENTS

| | | |
|---|---|---|
| 3,901,486 | 8/1975 | Matsui . |
| 4,125,333 | 11/1978 | Fields .......................... 366/79 |
| 4,213,709 | 7/1980 | Valsamis ..................... 366/76.1 |
| 4,227,816 | 10/1980 | Hold et al. ................... 366/99 |
| 4,413,913 | 11/1983 | Hold et al. ................... 366/76.3 |
| 4,473,299 | 9/1984 | Guibert ........................ 366/76.4 |
| 4,537,568 | 8/1985 | Larsson . |
| 4,562,973 | 1/1986 | Geng . |
| 4,636,084 | 1/1987 | Kopernicky ................... 366/79 |
| 5,153,008 | 10/1992 | Koch . |
| 5,335,992 | 8/1994 | Holl ............................. 366/69 |
| 5,540,495 | 7/1996 | Pikel ............................ 366/79 |

FOREIGN PATENT DOCUMENTS

| | | |
|---|---|---|
| 131059 | 1/1985 | European Pat. Off. . |
| 1155767 | 6/1969 | United Kingdom . |
| 1281332 | 7/1972 | United Kingdom . |

*Primary Examiner*—David Scherbel
*Assistant Examiner*—Tony G. Soohoo
*Attorney, Agent, or Firm*—Wenderoth, Lind & Ponack

[57] ABSTRACT

A supplying device and method make use of a cylinder and a rotary member rotatable in the cylinder for introducing and forwarding a band- or string-shaped raw material having a regular section along a fluidization passage formed between the cylinder and rotary member, while fluidizing the raw material into fluid material with frictional heat produced by the rotation of the rotary member. The fluid material is continuously discharged from a nozzle disposed on the cylinder to various processing devices such as a synthetic-resin molding machine or machine tool.

15 Claims, 8 Drawing Sheets

DEVICE AND METHOD FOR SUPPLYING FLUID MATERIALS

BACKGROUND OF THE INVENTION

1. Field of the Invention

This invention relates to a device and method for supplying fluid materials to various fluid-material processing devices, and more particularly to a device for continuously fluidizing a band- or string-shaped material into fluid material and supplying the fluid material to a synthetic-resin molding machine, food processing machine, machine tool or the like.

2. Description of the Prior Art

There are a variety of processing devices with fluid material supplying devices as used in a synthetic-resin molding machine, food processing machine or machine tool, in which granulated or powdered raw materials are kneaded, fluidized and fed in their fluidized state into the processing devices. In the field of synthetic-resin molding, the a material supplying device of this type may be called an extruder. In general, the material supplying device has a hopper for admitting the raw material into the device. Since the hopper opens upward, the granulated or powdered raw material easily spills from the hopper when tilting the material supplying device.

Generally, the material supplying device as used in the synthetic-resin molding machine comprises a cylinder for fluidizing given raw material into fluid material, which is provided at its leading end with a nozzle for discharging the fluid material and on its rear end portion with an inlet port for introducing the raw material into the cylinder, and a rotary member for forwarding the fluid material in the cylinder. The rotary member in the conventional material supplying device is usually a common screw or rotating blade rotatable in the cylinder. The rotary member is placed in its relatively loose state in the cylinder with a fluidization space between itself and the inner surface of the cylinder. By rotating the rotary member, the raw material introduced into the fluidizing space is fluidized with heat or pressure, while being fed toward the discharge nozzle. Incidentally, there are implications of "viscosity change", "plasticization" and "solution" in the term "fluidization" in a broad sense.

The fluid material supplying device sometimes includes a humidifier for moistening the raw material in order to fluidize the raw material, in addition to a heater for heating the given raw material.

As briefly stated above, the conventional raw material supplying device is disadvantageous in that it can be used only in a substantially upright posture or in such a state that the opening of the hopper is closed so as to prevent the raw material from easily spilling from the hopper even when tilting the supplying device. In either event, the granulated or powdered raw material is introduced from the hopper into the inside of the supplying device by free fall. Therefore, in the case where the supplying device is disposed aslant, the raw material cannot easily advance from the hopper inside the supplying device without a forced feed system for forcibly introducing the raw material from the hopper into the supplying device and forcibly forwarding the raw material in the supplying device toward the discharge nozzle at the leading end of the supplying device.

For instance, raw resin pellets usually used as raw material in a synthetic-resin injection molding machine do not easily advance in the supplying device even under normal conditions, thereby possibly causing inconvenient short shot in injection molding.

Therefore, even if the forced feed mechanism for introducing the raw material into the supplying device by force is incorporated, the conventional supplying device is unsuitable for use in a tilted state, and can in no way be used in its upside-down state.

Thus, the conventional fluid material supplying devices were very restricted in how there could be set (i.e. their setting posture) and with respect to the conditions in which they could be used, and could not supply raw materials of various kinds with stability and reliability.

OBJECT OF THE INVENTION

The present invention was made to eliminate the various drawbacks suffered by the conventional fluid material supplying devices, and has an object to provide a fluid material supplying device capable of smoothly and reliably taking in and forwarding raw material irrespective of the setting posture and conditions of the device.

Another object of the invention is to provide a fluid material supplying device which is simple in structure, which can stably fluidize the given raw material into fluid material and effectively send out the fluid material to a synthetic-resin molding machine, food processing machine, machine tool or the like.

Still another object of the invention is to provide a fluid material supplying device capable of appropriately controlling the forward movement and extrusion of fluid material fluidized in the device so as to supply the fluid material suitable for desired uses.

Yet another object of the invention is to provide a fluid material supplying device capable of using a band- or string-shaped raw material smaller in volume, density and weight than granulated or powdered raw material, consequently facilitating transport of the raw material and supply of the fluid material at a low cost.

A further object of the invention is to provide a fluid material supplying device having means capable of effectively and stably taking in a band- or string-shaped raw material without using any complicated material feeding system.

A still further object of the invention is to provide a fluid material supplying method making it possible to smoothly and reliably take in raw material irrespective of the setting posture and conditions of the device, and stably fluidize the raw material into fluid material and send out the fluid material to a synthetic-resin molding machine, food processing machine, machine tool or the like.

SUMMARY OF THE INVENTION

To attain the objects described above according to the present invention, there is provided a fluid material supplying device comprising a cylinder and a rotary member fitted rotatably in the cylinder to define a fluidization passage for fluidizing raw material into the fluid material. The raw material used in the supplying device has a regular section over its entire length and is formed in a continuous band or string shape and introduced into the fluidization passage defined between the cylinder and the rotary member. The fluidization passage has a section substantially complimentary to the section of the raw material. The cylinder is provided at its front end with a nozzle from which the material fluidized in the fluidization passage is extruded, and in its rear end portion with an inlet port for introducing the band- or string-shaped raw material into the cylinder. The raw material is continuously introduced into the cylinder and forwarded along the fluidization passage by rotating the rotary member. While advancing along the fluidization passage, the raw material is fluidized with frictional heat generated by rotating the rotary member in the cylinder.

Thus, the continuous raw material can be reliably introduced into the cylinder and stably forwarded along the fluidization passage toward the nozzle at the leading end of the cylinder in any setting posture of the device by the rotation of the rotary member. Consequently, the fluid material produced as the result of fluidization of the given raw material in the fluidization passage can stably be supplied to various processing devices without being affected by the setting conditions and posture of the supplying device.

The supplying device of this invention incorporates driving means for rotating the rotary member, and therefore, it can be made compact and simple in structure.

The rotary member can readily be controlled in rotation so as to appropriately control the fluidization of the raw material introduced into the cylinder. By stopping or reversing the rotation of the rotary member, supply of the fluid material can be controlled accurately.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Figure 1:
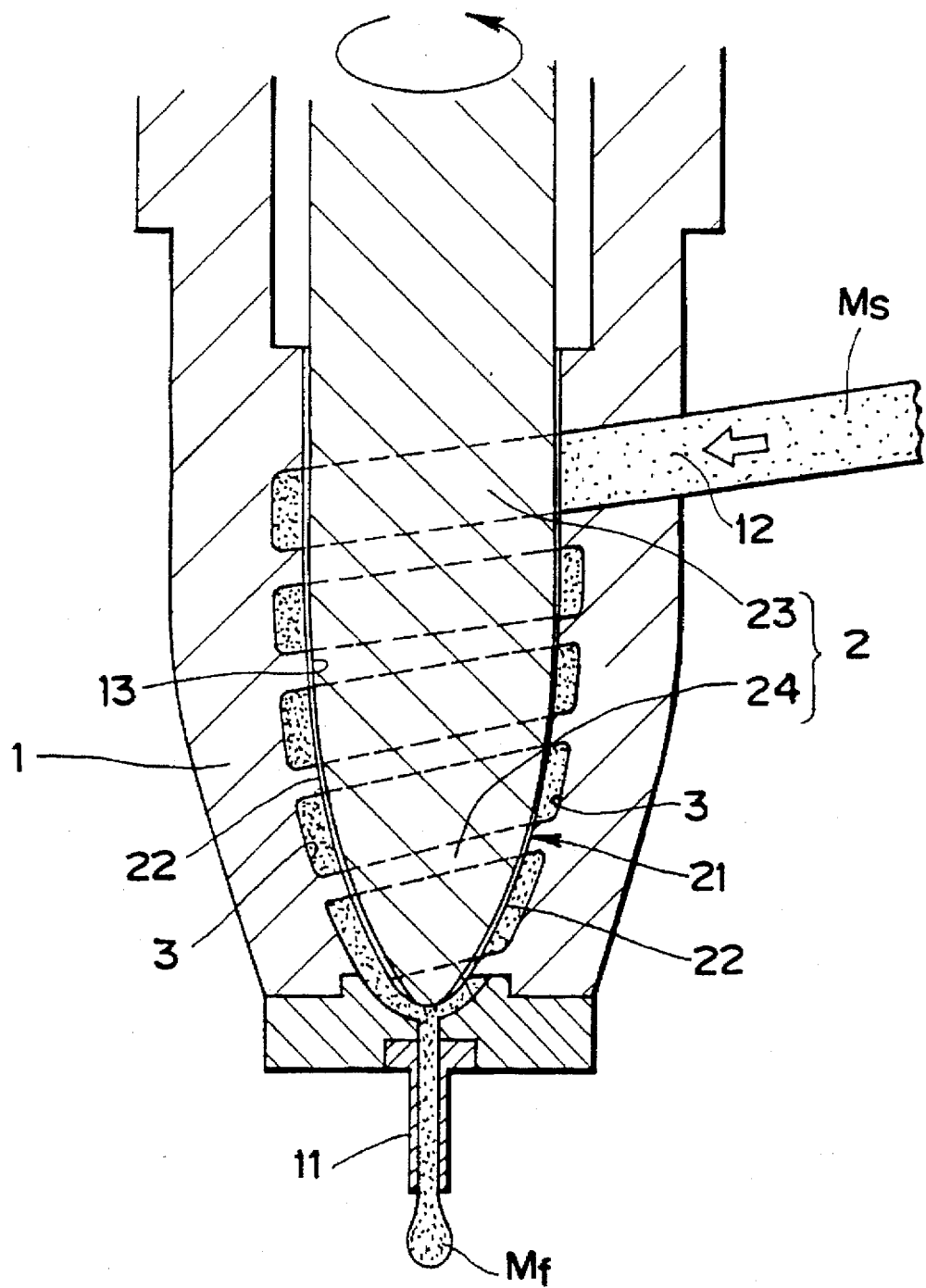
FIG. 1 is a cross section schematically showing the principal part of a first embodiment of the fluid material supplying device according to this invention.

The raw material supplying device according to this invention has a function of effectively fluidizing a long and thin solid raw material into fluid material and supplying the fluid material to various processing devices such as a synthetic-resin molding machine, food processing machine, and machine tool. The long and thin raw material used in the device of the invention is formed in a continuous band or string shape having a regular section such as a substantially a rectangle or a circle over its entire length.

The first embodiment of the supplying device according to this invention will be described hereinafter with reference to the accompanying drawings FIGS. 1 and 2. Although the following description is given on the assumption that the supplying device of this invention is an extruder for use in a synthetic-resin molding machine, this should not be understood as limiting.

The supplying device of this embodiment comprises a cylinder 1, and a rotary member 2 rotatably fitted in the cylinder 1. The cylinder 1 has at least one spiral guide groove in the inner surface thereof. The guide groove is covered with the rotary member 2 inserted in the cylinder 1, thereby forming a spiral fluidization passage 3 along which the raw material Ms is forwarded while being fluidized into fluid material. The fluidization passage 3 has a section substantially complementary to the aforenoted section of the raw material.

The hollow cylinder 1 has an inner surface including a tapered front surface 13 formed in a substantially semi-fusiform shape. The cylinder 1 is provided at its front end (lower end in the drawings) with a nozzle 11 for discharging the fluid material Mf fluidized in the fluidization passage 3, and in its rear end portion (upper end portion in the drawings) with an inlet port 12 for introducing the band- or string-shaped raw material Ms into the fluidization passage 3. In general, on the exterior or inside the peripheral wall of the cylinder 1, a heater (not shown) is mounted for quickening the fluidization of the raw material introduced into the cylinder 1.

The rotary member 2 has a rod-shaped major diameter portion 23, and a tapered front portion 24 formed in a substantially semi-fusiform shape in conformity with the tapered front surface 13 of the cylinder. Thus, the rotary member 2 is fitted closely in the cylinder 1, and driven to rotate in the cylinder by driving means 4 such as an electric motor. The driving means 4 is mounted within a casing 5 accommodating the cylinder 1.

The outer surface 21 of the rotary member 2, has antislip fine grooves 22 formed of a large number of notches or scratches by knurling or any other process.

The fluidization passage 3 for guiding the raw material Ms is practically formed by at least one spiral guide groove engraved in the inner surface of the cylinder 1 and extending from the inlet port 12 to the nozzle 11.

Figure 3A:
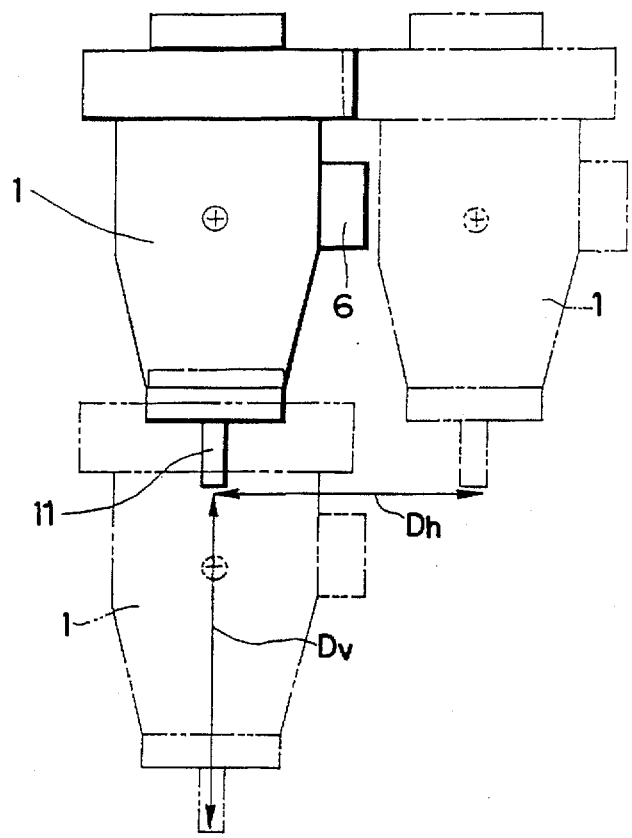
FIG. 3A is a schematic side view showing the horizontal and vertical mobility of the device of FIG. 1.

The raw material Ms may be produced by forming granulated or powdered synthetic resin or other material into a continuous long and thin band or string shape and wound compactly around a reel. Since the band- or string-shaped raw material is smaller in volume ratio than the granulated or powdered material, it is easy to handle and carry and can be made at a low cost. The reel around which the long and thin raw material is wound is set in a raw material container 6. The container 6 is attached to the inlet port 12 of the cylinder 1 as shown in FIG. 3A.

By rotating the rotary member 2 in the cylinder 1, the band- or string-shaped raw material Ms is drawn into the cylinder 1 through the inlet port 12 and forwarded along the fluidization passage 3. Since the raw material comes into frictional contact with the outer surface 21, and thus the fine antislip grooves 22, of the rotary member 2, it can be effectively fluidized into fluid material Mf while steadily advancing along the fluidization passage 3 toward the nozzle 11. Furthermore, since the raw material is guided by the major diameter portion 23 of the rotary member 2 at the outset, it is reliably drawn into the fluidization passage 3 with large rotational torque produced by the rotary member 2.

The raw material Ms introduced into the cylinder 1 is guided along the fluidization passage 3 and, while advancing toward the nozzle 11, fluidized into the fluid material Mf by the action of the rotary member 2 and cylinder 1 which are relatively rotated and generate frictional heat with the aid of the heater (not shown) incorporated in the cylinder 1. When the raw material Ms passes through the tapered front portion 24, which is smaller in internal volume than the major diameter portion 23, the pressure of the raw material is gradually increased to accelerate the fluidization of the raw material, thereby being transformed into the well-kneaded fluid material Mf.

Then, the fluid material Mf is extruded outside through the nozzle 11.

Figure 3B:
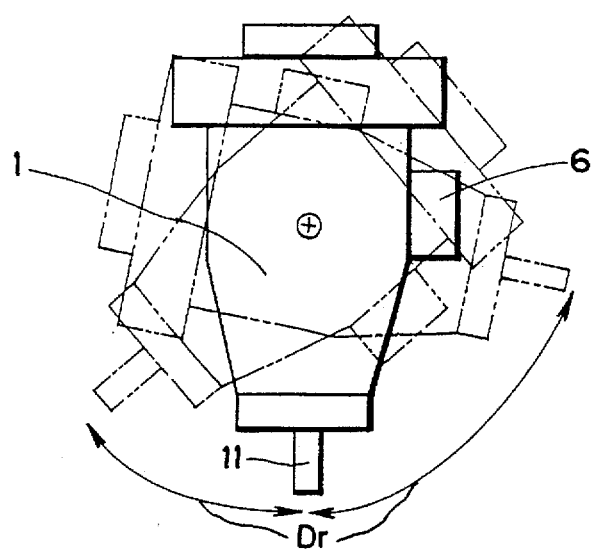
FIG. 3B is a schematic side view showing the rotational mobility of the supplying device of FIG. 1.

According to the raw material supplying device as described above, since the raw material Ms and fluid material Mf come in frictional contact with the rotary member 2 at all times, the raw material Ms can steadily be introduced into the cylinder i and the materials Ms and Mf can be effectively forwarded from the inlet port 12 to the nozzle 11 by force by the rotary member 2 under all conditions and all setting postures of the supplying device. That is, when the supplying device is moved horizontally as indicated by the arrow Dh in FIG. 3A and vertically as indicated by the arrow Dv, and rotated as indicated by the arrow Dr in FIG. 3B, the material supplying performance of the supplying device is not affected by the setting conditions of the device at all. Accordingly, the supplying device of this invention can readily be incorporated in machine tools of various types without requiring any restriction. Besides, since the supplying device of this invention integrally incorporates the driving means 4 and the raw material container 6, the supplying device can be made compact and operated independently of the machine tool, and has excellent general-purpose properties.

Figure 4:
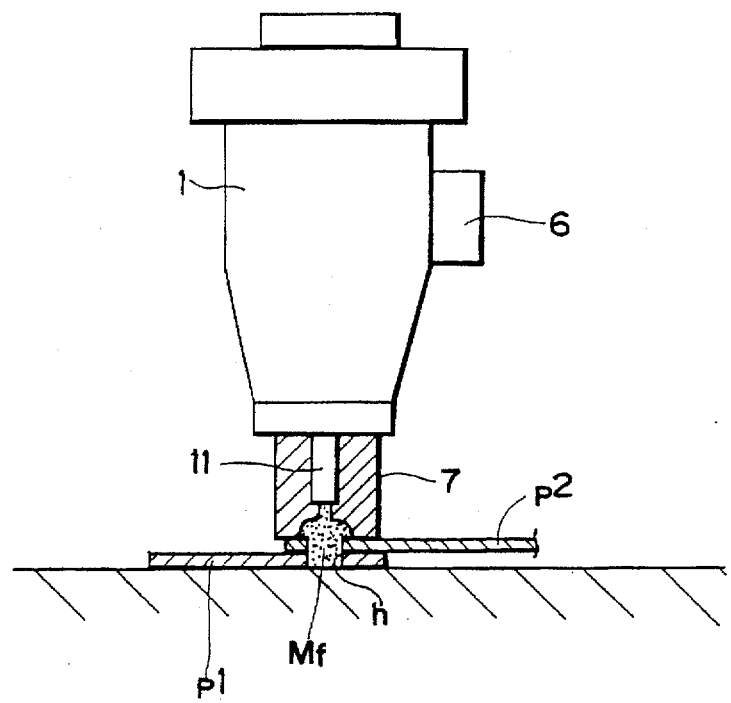
FIG. 4 is a schematic side view showing the supplying device of the invention, used as a riveting machine.

The supplying device shown in FIG. 4 is used as a riveting machine and has a rivet molding attachment 7 attached to the cylinder 1 (nozzle 11), so as to fill the fluid material Mf into a through-hole h bored in plates p1 and p2. As a result, the plates p1 and p2 are firmly united.

The rivet molding attachment 7 has a molding cavity shaped to form a substantially hemispheric rivet head. Therefore, the hardened material finally remaining on the united plates p1 and p2 has much the appearance of a rivet. In this embodiment, easily fusible metal or thermoplastic synthetic resin may be suitably used as the raw material Ms.

Figure 5:
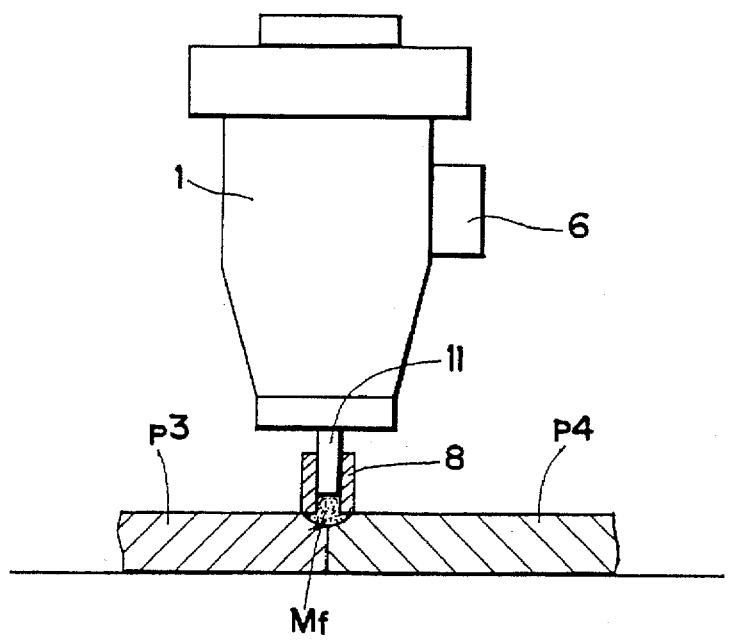
FIG. 5 is a schematic side view showing the supplying device of the invention, used as a welding machine.

FIG. 5 shows an example of the supplying device applicable to a welding machine according to this invention. This device has a heating sleeve 8 attached to the nozzle 11 of the cylinder 1 so as to extrude fluid material Mf to a butt portion of two panels p3 and p4 by rotating the rotary member in the cylinder 1. The fluid material Mf is hardened to unite the two panels. Also in this embodiment, easily fusible metal or thermoplastic synthetic resin may be suitably used as the raw material Ms.

The extrusion of the fluid material Mf from the nozzle 11 of the cylinder 1 is stopped by halting or reversing the rotation of the rotary member in the cylinder. Therefore, by using a servomotor as the driving means 4, the fluid material Mf can be quantitatively discharged through the nozzle 11.

Figure 6:
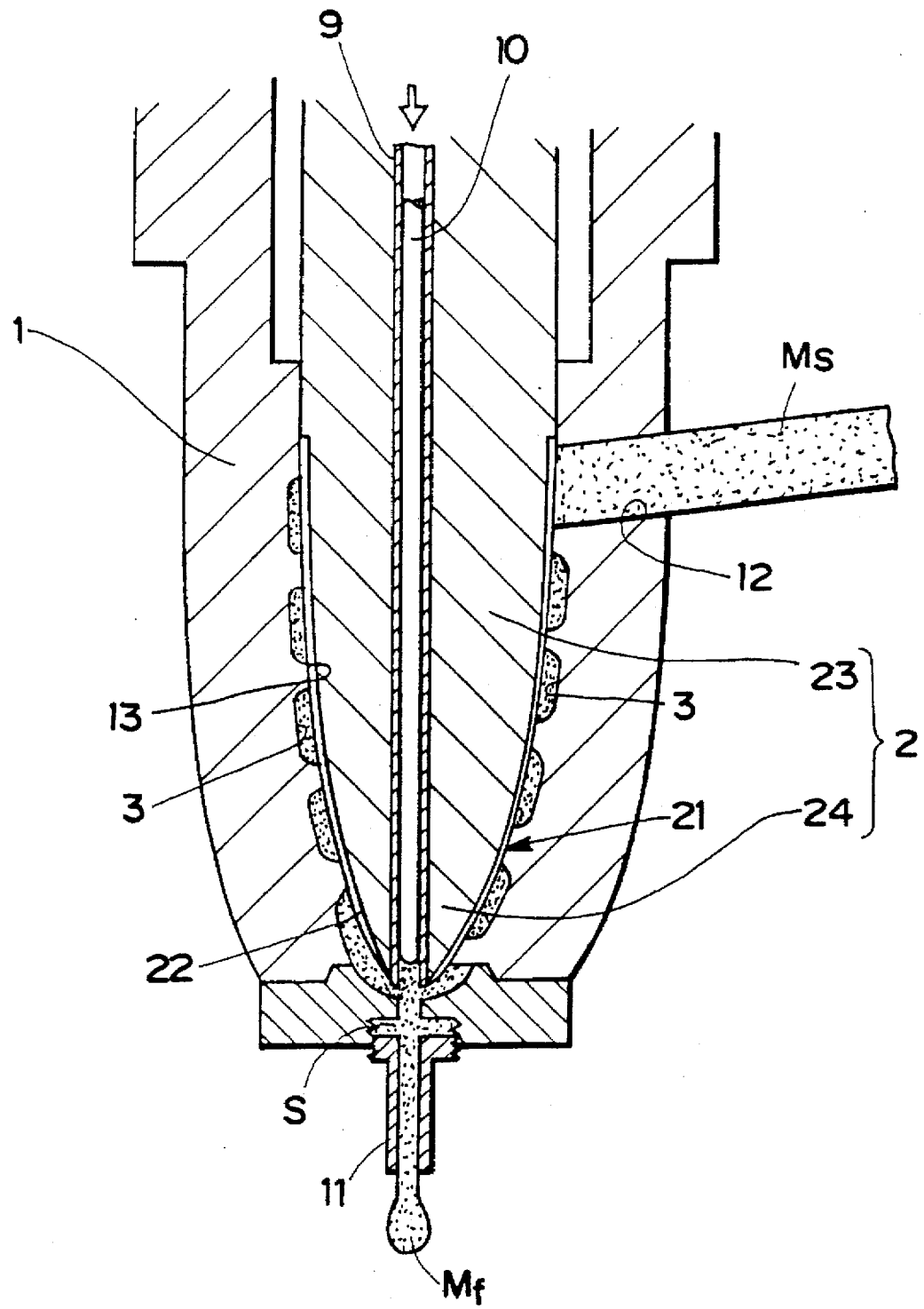
FIG. 6 is a schematic cross section showing the principal part of a second embodiment of the supplying device of the invention.

The second embodiment shown in FIG. 6 is applicable to an extruder for use in a synthetic-resin injection molding machine. In the illustrated embodiment, the elements depicted by like reference numerals with respect to those of the aforementioned first embodiment have analogous structures and functions to those of the first embodiment and will not be described in detail again.

The rotary member 2 has an axial through-hole into which a slidable sleeve 9 is inserted. The slidable sleeve 9 incorporates a plunger 10 slidable in the axial direction. The nozzle 11 in this embodiment is screwed in the front head of the cylinder 1 so as to form a variable material space S.

By thrusting the sleeve 9 toward the nozzle 11, the fluidization passage 3 is cut to isolate the material space S from the fluidization passage 3. Consequently, the amount of the fluid material in the material space S is quantitatively determined so that a desired amount of the fluid material can be extruded accurately by forcibly moving the plunger 10 forward.

By turning the nozzle 11, the volume of the material space S is changed so that the pressure of the material in the material space S can be adjusted to regulate the condition of plasticizing the given raw material.

Figure 7:
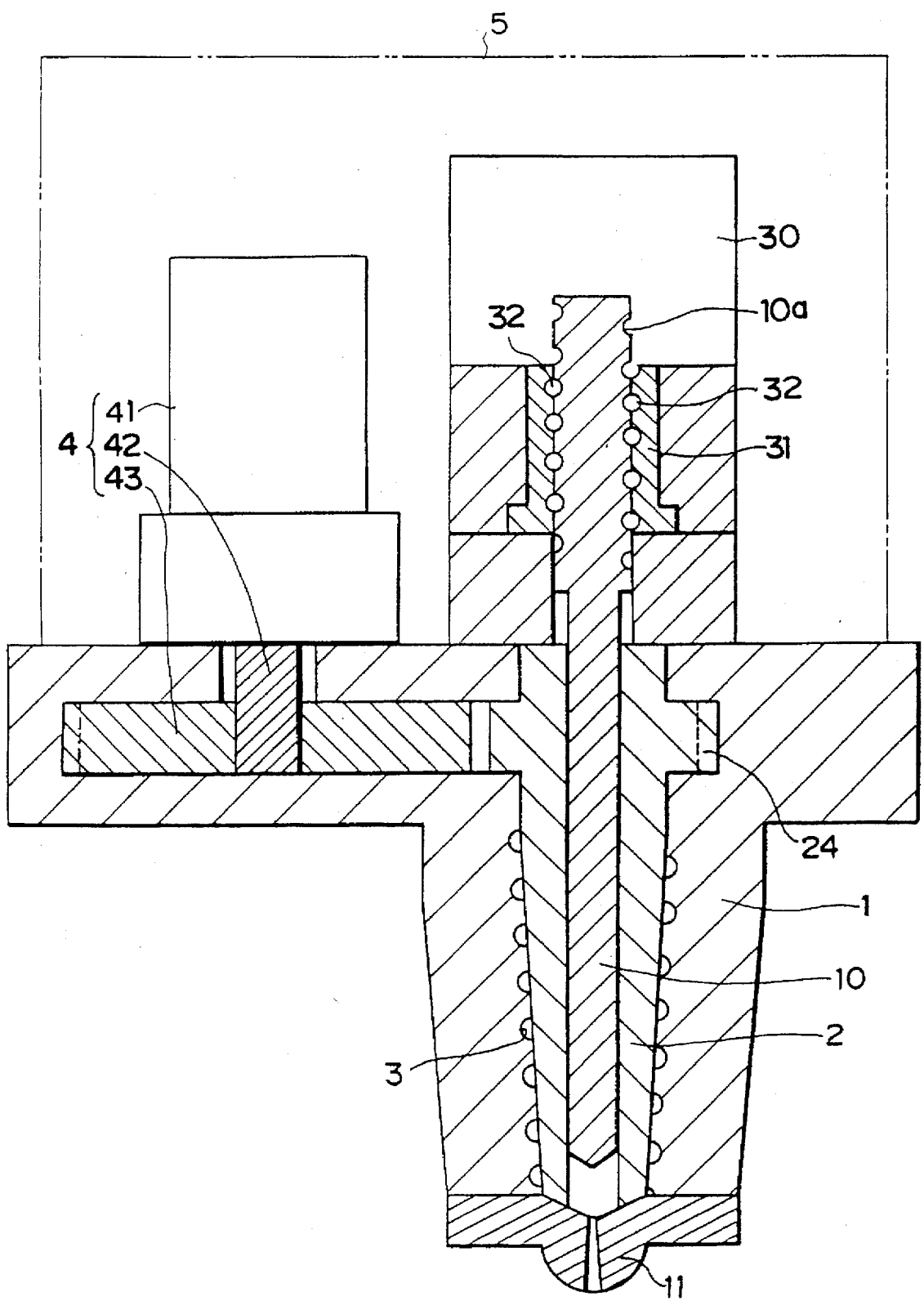
FIG. 7 is a schematic cross section showing a third embodiment of this invention.

FIG. 7 shows an entire structure of the supplying device of this invention, which integrally incorporates a driving unit including a follower gear 24 attached to the rotary member 2, and the driving means 4 comprising a driving body (electric motor) 41 having a rotational shaft 42 with a driving gear 43. The follower gear 24 of the rotary member 2 is meshed with the driving gear 43 of the motor 41 so that the rotational motion produced by the motor 41 is transmitted to the rotary member 2 to rotate the rotary member 2.

On the other hand, the rotary member 2 includes a plunger 10 which is driven by a plunger driving unit 30 such as a servomotor. The driving unit 30 has a hollow rotational shaft 31 which is provided in its inner surface with at least one groove. Correspondingly, in the circumferential outer surface of the rear end portion 10a of the plunger 10, there is formed at least one groove. The spaces defined at intersections between the grooves of the rotational shaft 31 and the rear end portion 10a of the plunger 10 accommodate transmission balls 32 by which the rotation produced by the plunger driving unit 30 is transformed to vertical linear motion to be imparted to the plunger 10. That is, by driving the plunger driving unit 30 to rotate the shaft 31, the plunger 10 is selectively moved back and forth in the axial direction.

Figure 8:
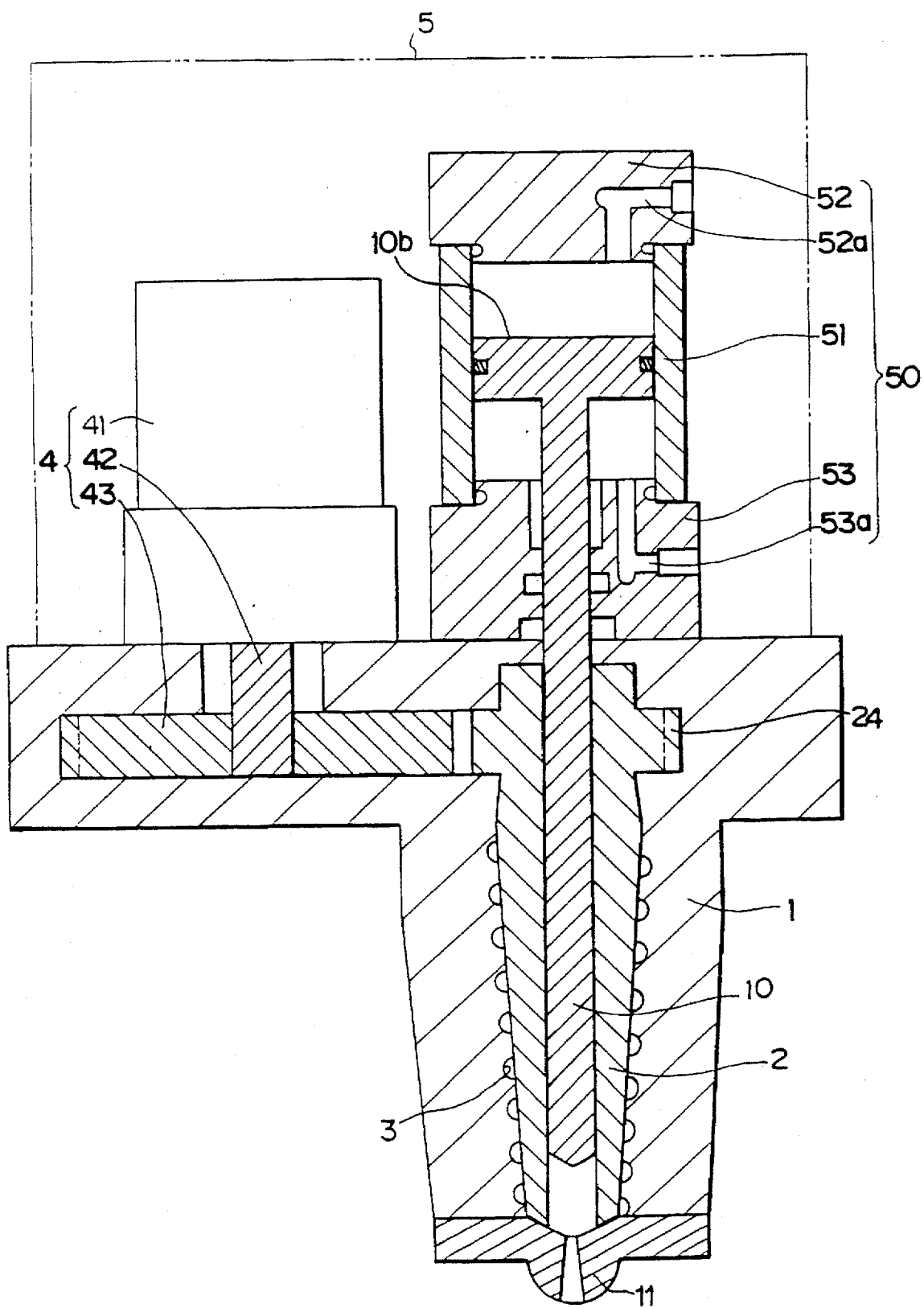
FIG. 8 is a schematic cross section showing a fourth embodiment of this invention.

FIG. 8 shows the fourth embodiment in which the plunger driving unit in FIG. 7 is modified. The driving means 4 for the rotary member 2 in this embodiment is the same as that in the foregoing embodiment.

The plunger 10 in this embodiment is provided on its rear end (upper end in the drawing) with a piston 10b. The vertical movement of the plunger 10 is fulfilled by a reciprocating unit 50. This reciprocating unit 50 comprises a cylinder 51 accommodating the piston 10b of the plunger 10, a cylinder head 52 with a pressure passage 52a, and a cylinder base 53 with a pressure passage 53a.

By selectively giving hydraulic pressure to either one of chambers partitioned by the piston 10b in the cylinder 51 through the pressure passages 52a and 53a, the plunger 10 is selectively moved back and forth in the axial direction. Thus, by controlling the operation of the plunger 10, a prescribed amount of fluid material can be extruded through the nozzle 11.

According to the structures of the embodiments shown in FIG. 7 and FIG. 8, the fluid material supplying device incorporating the driving means for the rotary member 2 and the plunger 10 can be made compact and suitably mounted onto various devices or equipment such as a synthetic-resin molding machine and machine tool irrespective of the setting posture and conditions of the device.

Figure 2:
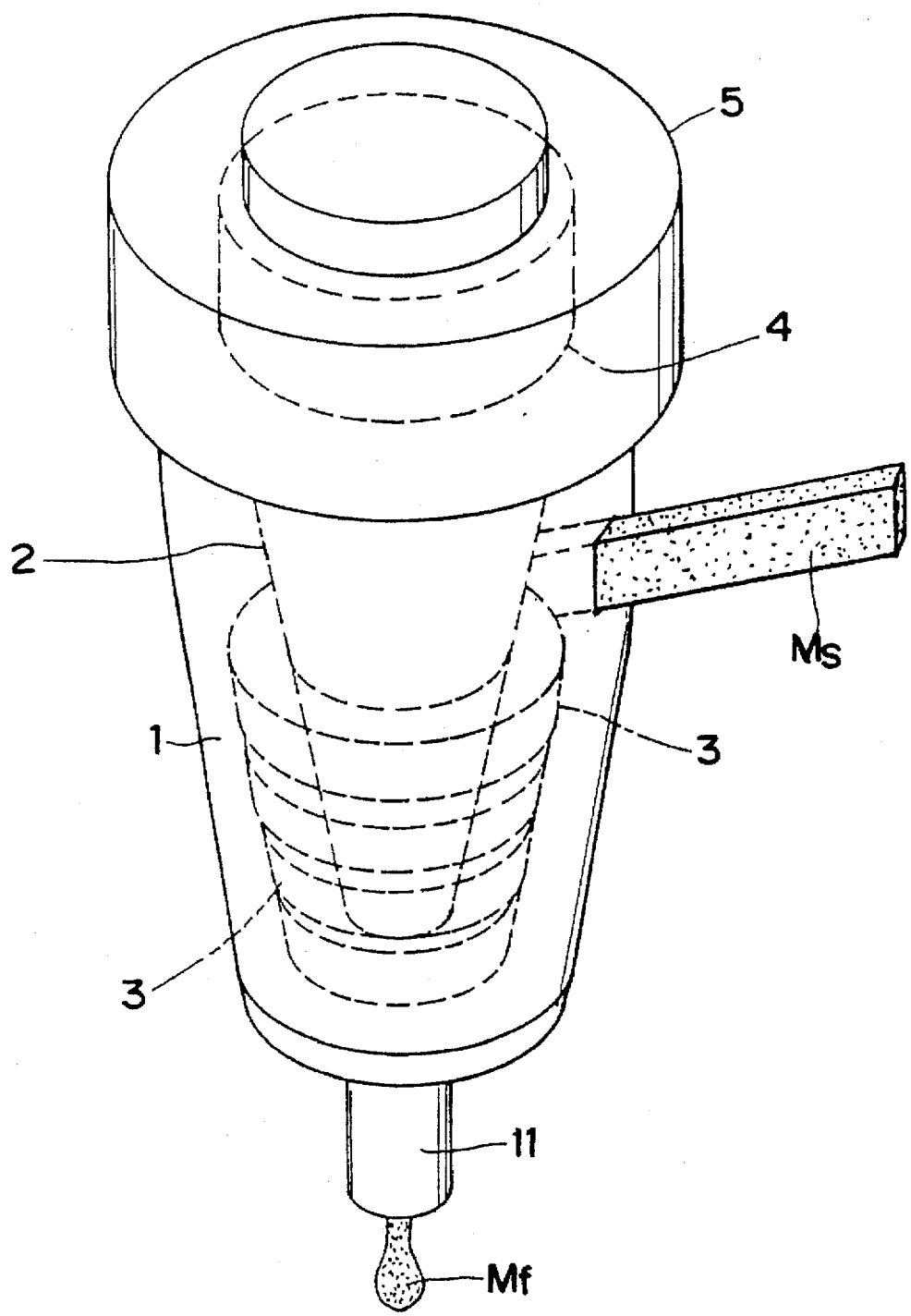
FIG. 2 is a schematic perspective view of the entire supplying device of FIG. 1.

The spiral fluidization passages 3 of the embodiments shown in FIG. 7 and FIG. 8 are shaped in a semicircle in cross section, unlike the embodiments in FIG. 1 and FIG. 6 having the spiral band-shaped fluidization passage having a regular cross section. However, the cross section of the fluidization passage is by no means limiting and the passage may have any other desired shape in conformity with the cross section of the given solid raw material.

Figure 9:
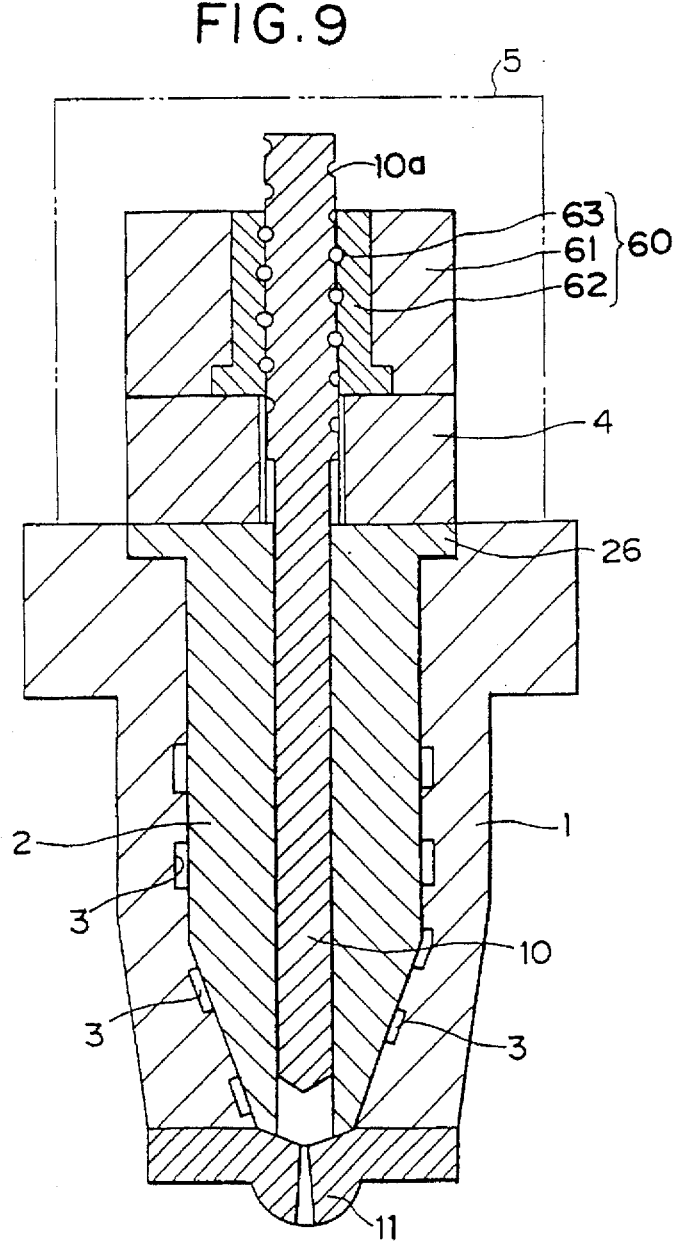
FIG. 9 is a schematic cross section showing a fifth embodiment of this invention.

FIG. 9 shows the fifth embodiment of the invention, in which a servomotor having a hollow rotor is used as the driving means 4 for rotating the rotary member 2. The rotor of the servomotor is connected with a flange 26 of the rotary member 2.

A plunger driving unit 60 in this embodiment for driving the plunger 10 is somewhat similar to that in the embodiment shown in FIG. 7. That is, the driving unit 60 has a servomotor 61 and a hollow rotational shaft 62. In the inner surface of the rotational shaft 62, there is formed at least one groove. The at least one groove in the rotational shaft 62 intersects at least one groove formed in the rear end portion 10a of the plunger 10, to thereby form spaces for accommodating transmission balls 63 by which the rotation produced by the servomotor 61 is transformed to vertical linear motion to be imparted to the plunger 10. That is, by driving the driving unit 60 to rotate the shaft 62, the plunger 10 is selectively moved back and forth in the axial direction. Also, the fluid material supplying device of this embodiment can be made compact.

Moreover, the fluidization passage 3 in this embodiment of FIG. 9 is formed by not only the spiral groove in the inner peripheral surface of the cylinder 1, but also the outer peripheral surface of the front end (lower end) of the rotary member 2. According to this structure, the raw material Ms can be effectively kneaded in the cylinder 1.

Figure 10:
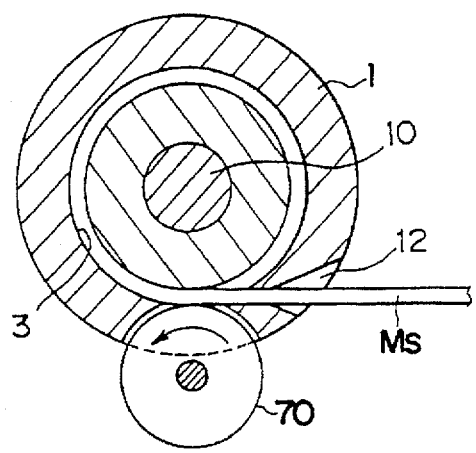
FIG. 10 is a schematic plan view showing a sixth embodiment of this invention.

To improve the efficiency of introducing the raw material Ms into the fluidization passage 3 in the cylinder 1, a feed roller 70 may be mounted near the intake port 12 as shown in FIG. 10. In the case of using the feed roller 70, the antislip fine grooves 22 formed in the outer surface of the rotary member 2 employed in the first embodiment are not absolutely necessary to this invention.

As specified above, the kind and shape of the raw material to be given to the supplying device of this invention are not specifically limited, twisted strands may be used as the raw material.

As is apparent from the foregoing description, since the fluid material supplying device according to the present invention comprises the cylinder and the rotary member between which the fluidization passage is formed for continuously forwarding given band- or string-shaped raw material, the raw material can be smoothly and reliably introduced into the cylinder, and effectively fluidized into desirable fluid material. Therefore, the supplying device can be stably mounted on fluid material processing devices or equipment such as a synthetic-resin molding machine, food processing machine or machine tool, irrespective of the setting posture and conditions of the device. Furthermore, since the supplying device of this invention incorporates compact driving means for the rotary member and the plunger, it is applicable to various types of the processing devices.

Besides, since the fluid material supplying device of this invention processes a band- or string-shaped raw material smaller in volume, density and weight than granulated or powdered raw material, transport of the raw material and supply of the fluid material can be carried out at a low cost.

Although the invention has been described in its preferred form with a certain degree of particularity, it is understood that the present disclosure of the preferred form can be changed in the details of construction and the combination and arrangement of parts without departing from the spirit and the scope of the invention as hereinafter claimed.

What is claimed is:

1. A fluid material supply device for use in fluidizing a material, provided as a continuous long and thin raw material having a regular cross-sectional shape, into fluid material, said fluid material supply device comprising:

a cylinder comprising a first end and a second end;

a rotary member fitted rotatably in said cylinder so as to define a fluidization passage, having a cross-sectional shape generally complementary to the cross-sectional shape of the long and thin raw material, between said cylinder and said rotary member for fluidizing the material into the fluid material;

a driving device for rotating said rotary member;

wherein said first end of said cylinder has an outlet;

wherein said second end of said cylinder has an inlet for continuously introducing the long and thin raw material into said fluidization passage; and wherein a nozzle is provided at said first end of said cylinder in communication with said outlet for discharging the fluid material fluidized in said fluidization passage;

whereby the material is forwarded along said fluidization passage while being fluidized by rotation of said rotary member relative to said cylinder so as to be quantitatively discharged from said nozzle as fluid material.

2. A fluid material supply device as recited in claim 1, wherein said rotary member has an outer surface, and anti-slip fine grooves are provided in said outer surface of said rotary member.

3. A fluid material supply device as recited in claim 1, further comprising a feed roller mounted to said cylinder for introducing the long and thin raw material into said inlet.

4. A fluid material supply device as recited in claim 1, further comprising a raw material container mounted to said cylinder for accommodating a supply of the long and thin raw material.

5. A fluid material supply device as recited in claim 1, wherein said rotary member has an axial through-hole therein;

a sleeve is provided in said axial through-hole; and a slidable plunger is movably mounted in said sleeve so as to quantitatively discharge the fluid material through said nozzle.

6. A fluid material supply device as recited in claim 1, wherein said nozzle and said cylinder are provided with complementary screw threads; and said nozzle is movably mounted to said cylinder by said complementary screw threads so as to form a variable material-receiving space between said nozzle and said cylinder.

7. A fluid material supply device as recited in claim 1, wherein said nozzle is mounted to said cylinder so as to form a material-receiving space between said nozzle and said cylinder; and said nozzle is movable relative to said cylinder so as to vary a volume of said material-receiving space.

8. A fluid material supply device as recited in claim 1, wherein said rotary member has an axial through-hole therein; and a slidable plunger is movably mounted in said axial through-hole so as to quantitatively discharge the fluid material through said nozzle.

9. A fluid material supply device as recited in claim 8, further comprising a driving unit for axially moving said plunger relative to said cylinder.

10. A fluid material supply material, provided as a device for fluidizing a long and thin raw material having a regular cross-sectional shape, into fluid material, said fluid material supply device comprising:

a cylinder having an inner surface including a tapered front surface formed in a substantially semi-fusiform shape and a spiral groove, said cylinder having an inlet port for introducing the long and thin raw material thereinto and a nozzle for discharging the fluid material;

a raw material container attached to said inlet port of said cylinder for supplying the long and thin raw material into said cylinder through said inlet port;

a rotary member having a rod-shaped major diameter portion, and a tapered front portion formed in a substantially semi-fusiform shape complementary to said tapered front surface of said cylinder, said rotary member being rotatably fitted in said cylinder so as to cover said spiral groove in the inner surface of said cylinder to form a fluidization passage having a cross-sectional shape generally complementary to the cross-sectional shape of the long and thin raw material; and a driving device for rotating said rotary member;

whereby the material is forwarded along said fluidization passage while being fluidized by rotation of said rotary member relative to said cylinder so as to be quantitatively discharged from said nozzle as fluid material.

11. A fluid material supply device as recited in claim 10, wherein said rotary member has an axial through-hole therein;

a sleeve is provided in said axial through-hole; and a slidable plunger is movably mounted in said sleeve so as to quantitatively discharge the fluid material through said nozzle.

12. A fluid material supply device as recited in claim 11, further comprising a driving unit for moving said slidable plunger relative to said rotary member.

13. A fluid material supply device as recited in claim 10, wherein said rotary member has an axial through-hole therein; and a slidable plunger is movably mounted in said axial through-hole so as to quantitatively discharge the fluid material through said nozzle.

14. A fluid material supply device as recited in claim 13, further comprising a driving unit for axially moving said plunger relative to said cylinder.

15. A method for fluidizing material into fluid material, comprising:

forming raw material into a long and thin band- or string-shaped material having a regular cross-section;

continuously introducing the long and thin band- or string-shaped material through an inlet port of a cylinder into a fluidization passage formed between a cylinder and a rotary member and having a cross-sectional shape generally complementary to the cross-sectional shape of the long and thin band- or string-shaped material;

forwarding the material along said fluidization passage by rotating said rotary member relative to said cylinder;

fluidizing the material forwarded along said fluidization passage with frictional heat generated by said rotary member; and discharging the material as fluid material from a nozzle disposed on said cylinder.

* * * * *